(12) United States Patent
Wark et al.

(10) Patent No.: US 6,260,490 B1
(45) Date of Patent: *Jul. 17, 2001

(54) BURNER ISOLATION VALVE FOR PULVERIZED FUEL SYSTEMS

(75) Inventors: Rickey E. Wark, The Woodlands, TX (US); John Anthony Nardi, Clinton Township, MI (US)

(73) Assignee: Sure Alloy Steel Corporation, Madison Heights, MI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/504,917

(22) Filed: Feb. 16, 2000

(51) Int. Cl.[7] ................. F23K 3/02; F23L 5/00; F23L 13/00; F23J 11/00; F23N 3/00
(52) U.S. Cl. .................. 110/101 R; 110/297; 110/182.5; 110/106; 110/104 R; 110/147; 126/285 A; 251/172; 251/159; 251/302; 251/327; 251/231
(58) Field of Search .................... 110/260, 147, 110/297, 185.5, 103, 106, 162, 163, 101 R, 104 R, 104 B, 102; 49/477.1; 126/285 A; 251/172, 193, 159, 302, 327, 231

(56) References Cited

U.S. PATENT DOCUMENTS

| | | | |
|---|---|---|---|
| 563,987 | * 7/1896 | Smith | 110/106 |
| 610,076 | * 8/1898 | McClure | 251/327 |
| 2,582,877 | * 1/1952 | Mekler | 251/65 |
| 2,657,661 | * 11/1953 | Robson | 114/201 |
| 2,683,581 | * 7/1954 | Rovang | 251/327 |
| 3,178,779 | * 4/1965 | Clark et al. | 251/214 |
| 3,302,333 | * 2/1967 | Ganzinotti et al. | 49/281 |
| 3,339,785 | * 9/1967 | Nugent | 220/41 |
| 3,788,346 | * 1/1974 | Fitgerald | 137/330 |
| 3,831,622 | * 8/1974 | Grewer et al. | 137/340 |
| 3,831,950 | * 8/1974 | Bentley et al. | 277/75 |
| 4,144,902 | * 3/1979 | Mahr et al. | 137/246.22 |
| 4,164,211 | * 8/1979 | Onnen | 126/285 |
| 4,381,100 | * 4/1983 | Schoenberg | 251/368 |
| 4,724,863 | * 2/1988 | Conner | 137/240 |
| 5,001,866 | * 3/1991 | Powell et al. | 49/477 |
| 6,012,199 | * 1/2000 | Litomisky et al. | 15/301 |
| 6,089,537 | * 7/2000 | Olmsted | 251/129.11 |

\* cited by examiner

Primary Examiner—Denise L. Ferensic
Assistant Examiner—K. B. Rinehart
(74) Attorney, Agent, or Firm—Young & Basile, P.C.

(57) ABSTRACT

A burner isolation valve or gate for use in the coal-delivery pipes of coal-fired power plants. Safety regulations often require that two valves be placed in the coal delivery line between a combustion chamber and an exhauster or pulverizer type deliver source to isolate the section of pipe in between for maintenance and other access. The invention includes a novel valve plate and actuation assembly, a novel housing adapted to sealingly enclose the valve plate, and a novel sealing mechanism for the valve plate and housing adapted to keep coal fines and dust out of the outboard portion of the housing in which the valve plate rests in the valve-open position.

21 Claims, 10 Drawing Sheets

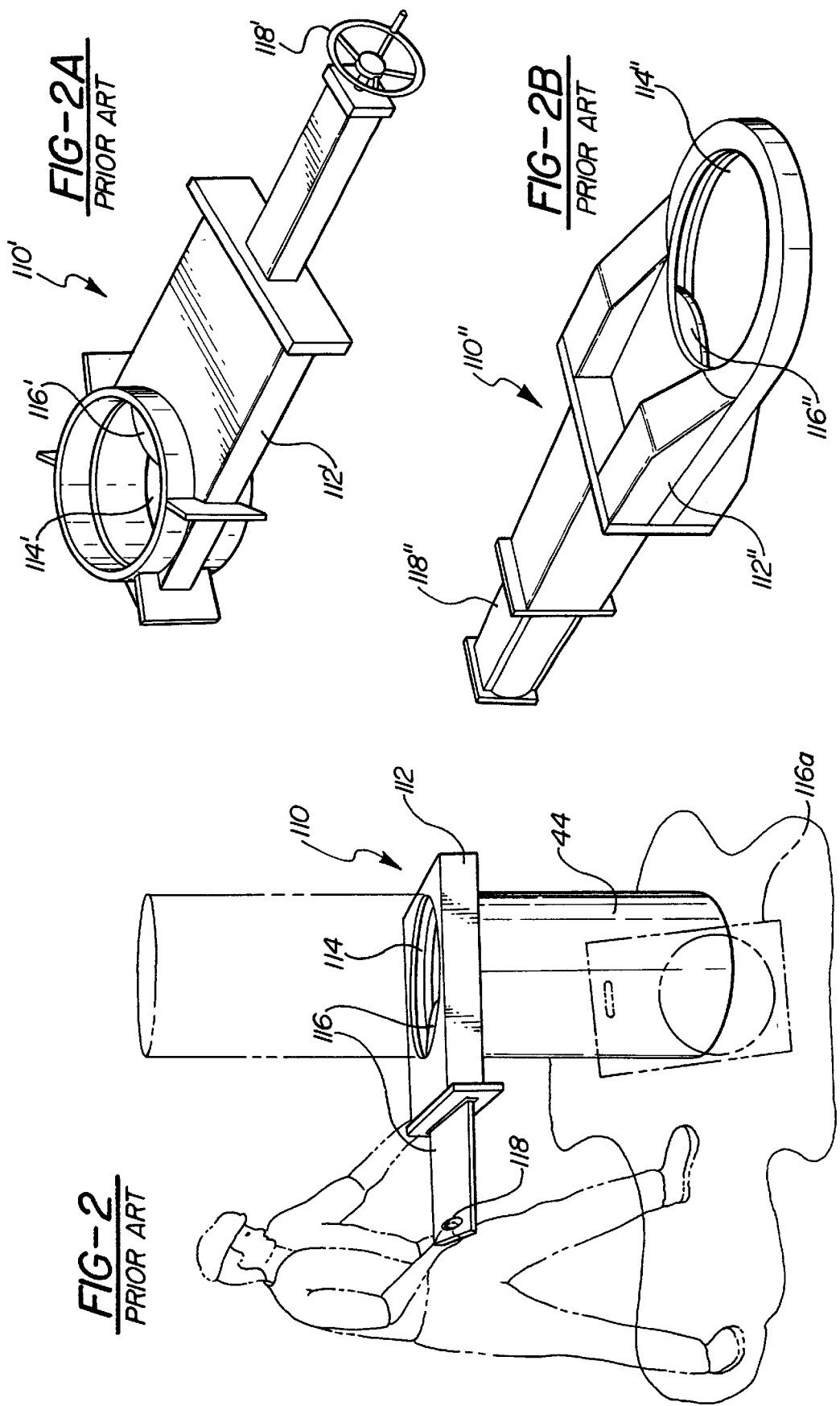

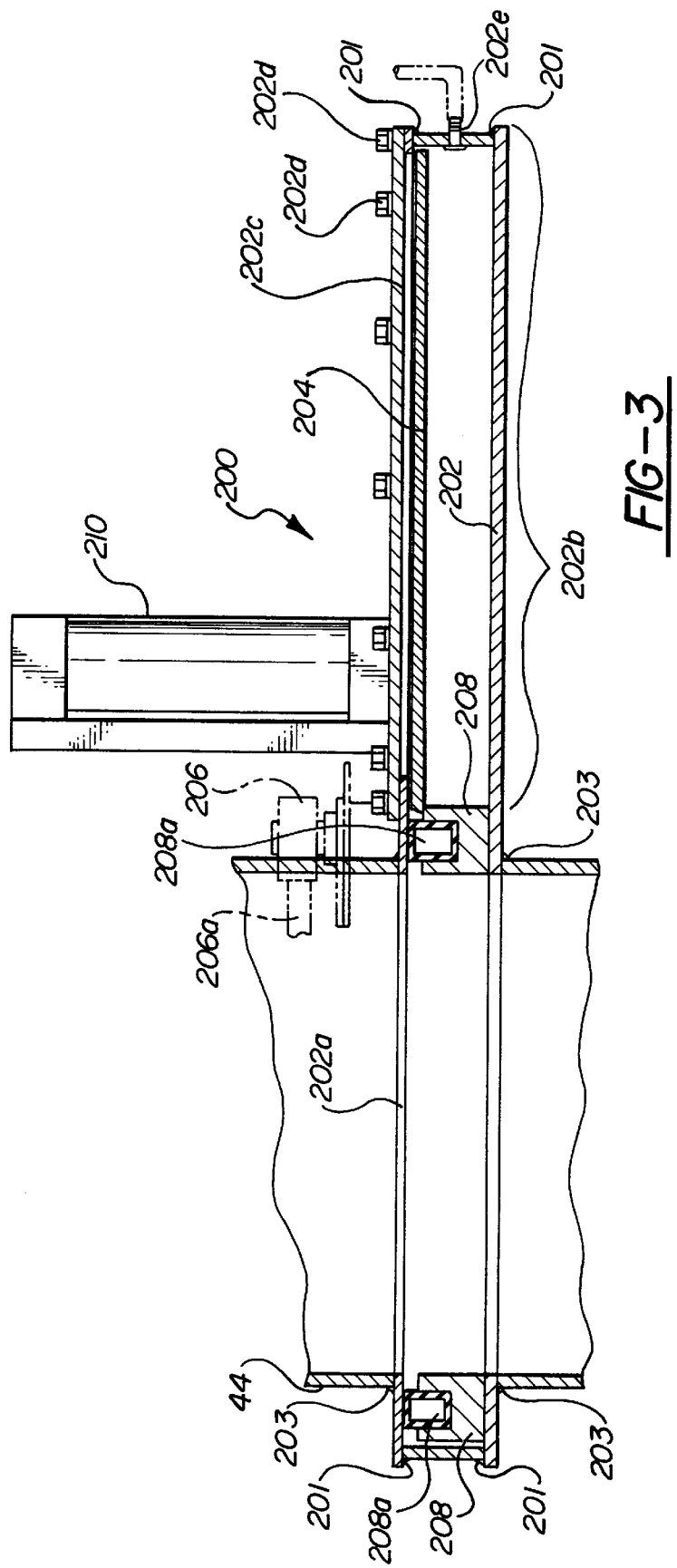

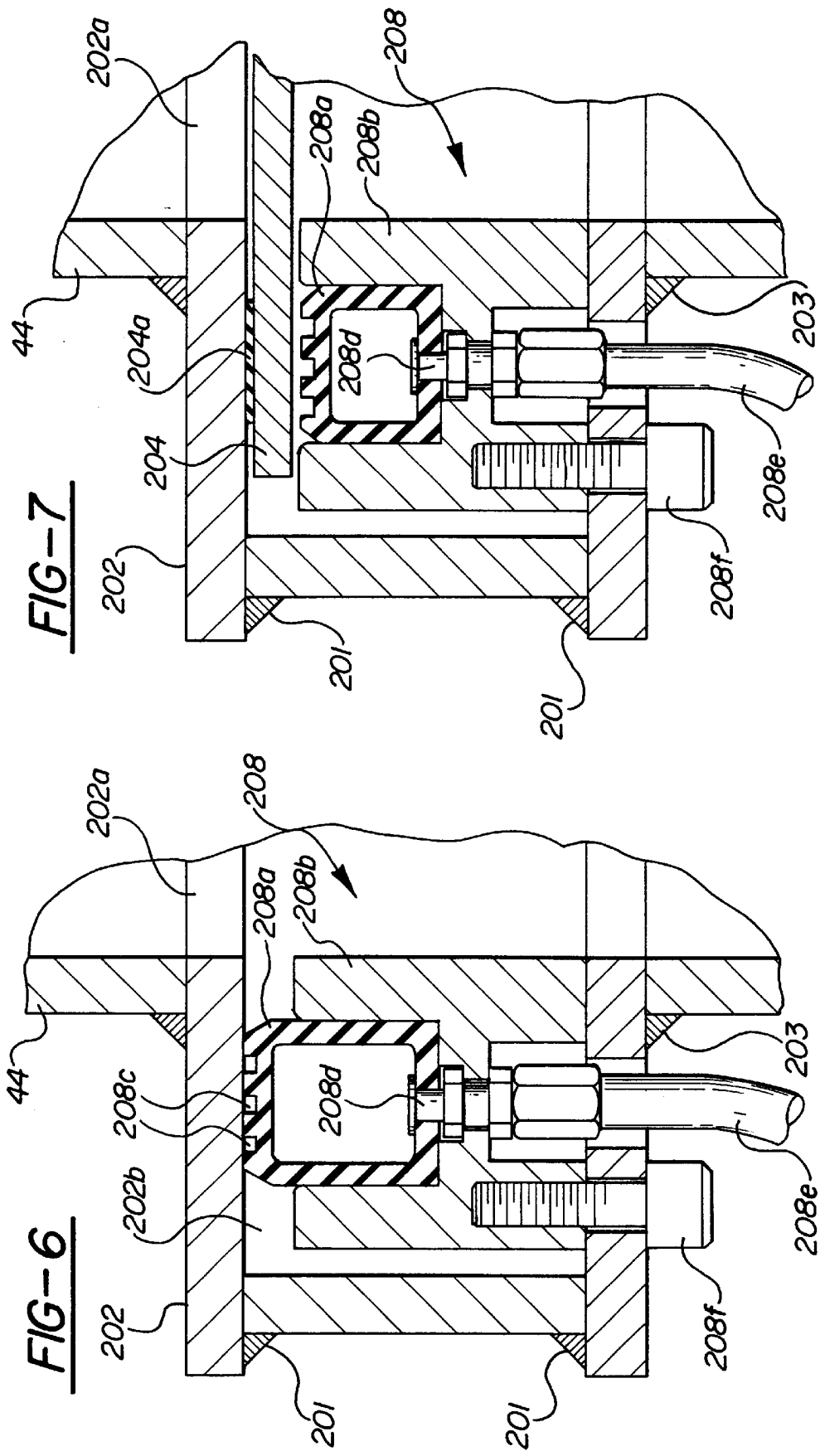

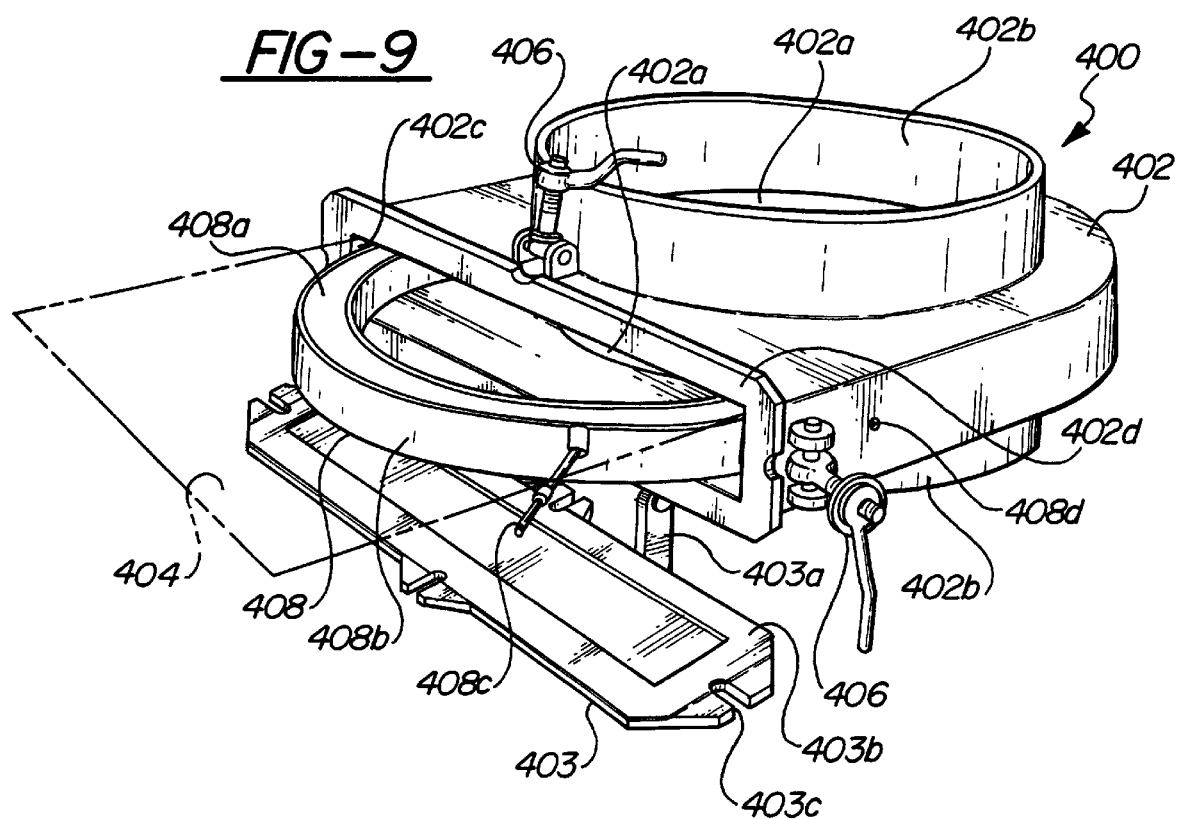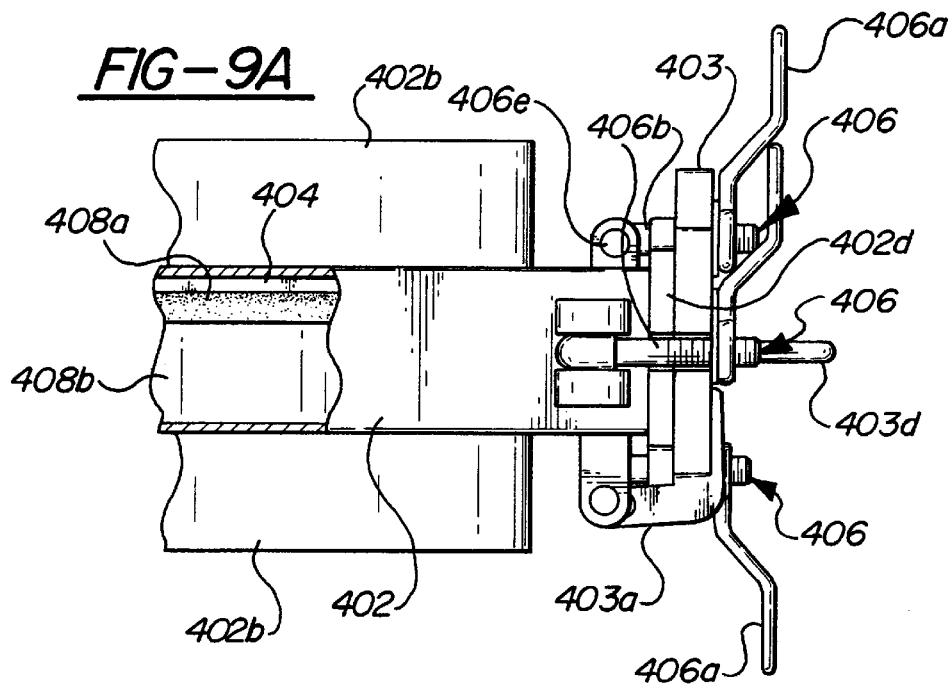

BURNER ISOLATION VALVE FOR PULVERIZED FUEL SYSTEMS

FIELD OF THE INVENTION

This invention is in the field of equipment for delivering pulverized coal to coal-fired combustion chambers of the type used in power generating plants, and more particularly relates to the gate or shutoff valve structure commonly found in the delivery pipes between a pressurized coal supply and the combustion chamber.

BACKGROUND OF THE INVENTION

Power plants using coal-fired combustion chambers are typically supplied with coal from an on-premises coal mill or pulverizer. Ground coal "fines" are delivered from the pulverizer to the combustion chamber, often by means of an exhauster fan or some other source of suction or pressure sufficient to pneumatically carry the dust-like fines from the mill through delivery pipes to the combustion chamber.

Occasionally it is necessary to isolate a section of delivery pipe to allow work on a mill, pulverizer, or exhauster fan. Common sense and certain codes require that the system being worked on be isolated from the combustion chamber to prevent a reverse "puff" of positive pressure (and heat, gas or coal dust) from the combustion chamber in reverse through the pipe.

At the present time, it is believed that the National Fire Protection Agency applies certain standards and requirements to such shutoff valves, for example NFPA Valve Requirements 2-5.1.2.1 (Pulverized Fuel Systems):

> "2-5.1.2.1 For a suction furnace that can be fired by other main fuels or is connected to two or more pulverizers or exhausters, valves shall be installed to isolate all burner lines. This requirement can be met with one dust tight and one barrier valve or two dust tight valves. A dust tight valve shall be installed in the burner pipe as close to the furnace as practicable. The second valve shall be installed as close to the pulverizer as practicable. The valves shall be closed prior to entering a pulverizer, exhauster, or fuel piping."

Such valves are not only used for temporarily closing off sections of coal delivery pipe for maintenance, but they may be used to close down certain sections of the piping for as long as several years. They accordingly must be robust, and yet in the case of dust tight valves maintain a tight seal relative to the isolated section of pipe. Other difficulties encountered in the manufacture and installation of such valves include: the release of pressurized fines from the conduit when the valve is opened and closed; the entrapment of fines within various parts of the shutoff valve mechanism; and the need to maintain a dust tight seal around the valve housing or enclosure when the valve is open.

SUMMARY OF THE INVENTION

The present invention is a burner isolation valve and sealing arrangement with a novel pivoting-type opening/closing mechanism for the valve plate; a novel sealed housing for the valve plate as it moves between the open and closed positions; and an improved sealing arrangement in which a built-in seal can be inflated/deflated into and out of sealing engagement with the conduit in the valve-open position and with the valve plate in the valve-closed position.

In a preferred form the valve plate is pivot-mounted in a sealed housing which bisects the coal delivery pipe. The valve plate pivots between open and closed positions while contained entirely within the housing, riding on a pivot point controlled by an external lever or actuator accessible from outside the housing. In one embodiment the valve plate is a novel tear drop-shape which lends itself particularly well to the pivot actuation of the invention.

In a further preferred form of the invention, the housing includes a built-in sealing arrangement associated with the delivery pipe, comprising an annular, inflatable seal mechanism positioned to engage the housing around the perimeter of the delivery pipe in the valve-open position, and to engage the perimeter of the valve plate in the valve-closed position. In this manner the delivery pipe can be sealed from the remainder of the housing in both the valve-open and valve-closed positions. In a first form, the inflatable seal can be pressurized by the same source that supplies pressure to the housing around the conduit. In a second form the seal can be inflated/deflated by a separate pressure source, for example an air/fluid accumulator attached to the housing.

In a further preferred form the housing is sealed dust tight, and is optionally pressurized around the delivery pipe and inflated seal as a backup to the seal to keep coal fines out of the housing, thereby ensuring that the valve plate moves freely and seats properly in the housing in the valve-open and valve-closed positions.

The invention is useful for both dust-tight and barrier valve installations, through use of an optional gasket on the side of the valve plate opposite the inflatable seal.

These and other advantages and features of the invention will become apparent upon further reading of the specification in light of the accompanying drawings.

BRIEF DESCRIPTION OF THE DRAWINGS

FIG. 2 illustrates a manually operaed prior art sliding gate arrangement for shutting off a coal delivery pipe;

FIGS. 2A and 2B represent prior art sliding gate valves similar to FIG. 2, but showing different operating mechanisms;

FIG. 3 is a side elevation view, in section, of a valve plate, housing, and sealing arrangement according to the present invention, in the valve-open position;

FIG. 6 is a detailed view, in section, of the sealing arrangement illustrated in FIG. 3, in the seal-inflated, valve-open position;

FIG. 7 illustrates the sealing arrangement of FIG. 6 in a valve-closed, seal-deflated position, and further illustrates an optional dust-tight valve plate arrangement;

FIG. 9 is a perspective view of a sliding plate embodiment of the invention, with its housing opened and its seal assembly partway removed; and, FIG. 9A is a side section view of the sliding valve plate embodiment of FIG. 9.

DETAILED DESCRIPTION OF THE ILLUSTRATED EMBODIMENT

Figures 1, 1A:
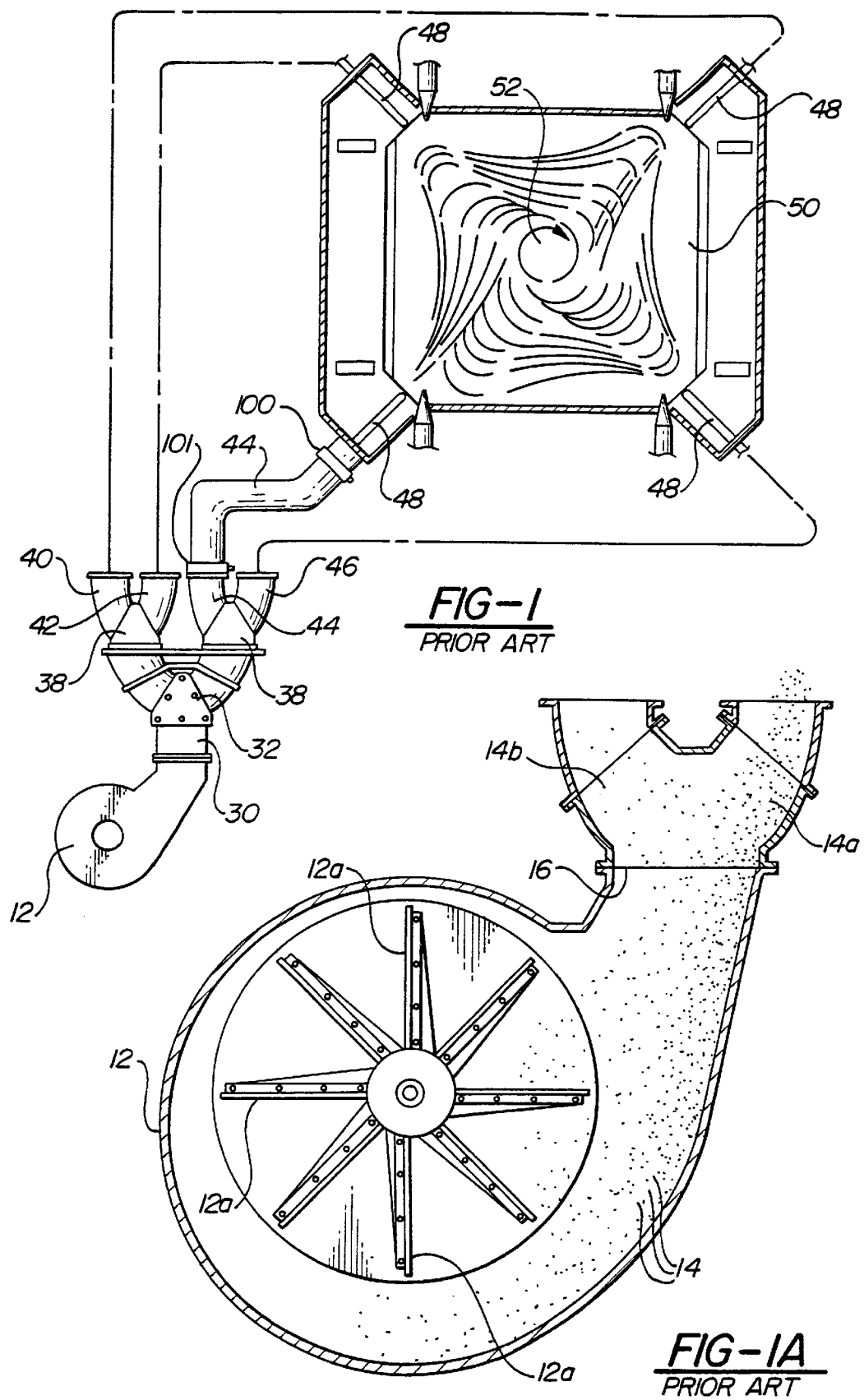
FIG. 1 is a schematic illustration of a coal delivery system for a combustion chamber, from an exhauster fan through multiple pipes to burners located in the combustion chamber, as is known in the prior art.
FIG. 1A is a sectioned schematic cross section of the exhauster fan and pipe, illustrating the flow of coal particles therein, also according to the prior art.

Referring first to FIG. 1, a typical prior art exhauster fan, delivery pipe and "riffle box" arrangement is shown feeding a four-burner array in a combustion chamber. The delivery pipe begins as a single pipe 30 near the outlet of exhauster fan 12 feeding into a primary riffle box 32 comprising a spaced series of vertical, somewhat triangular riffle plates spaced by angled separator bars whose angle alternates from plate to plate. Riffle boxes are well known devices for attempting to even out the coal flow from exhauster 12, which flow tends to separate into heavy and light flows distributed across the area of pipe 30 as it leaves the exhauster fan.

The primary riffle box is designed to split the flow from main pipe 30 into two branches 34, 36. Branches 34, 36 are in turn split by secondary riffle boxes 38 into four branches 40, 42, 44, 46 which feed each of the four burners in the illustrated array. Although FIG. 2 illustrates a typical four-corner array of burners 48 for a tangentially-fired combustion chamber, it will be understood by those skilled in the art that the present invention described below is useful for other types of combustion chamber and delivery pipe arrangements.

FIG. 1 also schematically illustrates the location of a pair of burner isolation valves 100 and 101, located on pipe 44 in a manner which is known to those skilled in the art and which may be required by certain safety codes. Although valves 100, 101 are illustrated only on the shortest pipe 44, it will be understood that each of the pipes between exhauster fan 12 and burners 48 is normally provided with a similar arrangement of two valves such that every burner line can be isolated between the exhauster and burner.

Valves 100, 101 can comprise two dust tight valves, or a dust tight valve and a "barrier" (non-dust tight valve). If only one of the valves is dust tight, the dust tight valve is normally placed as close to the combustion chamber as practicable, i.e. valve 100 is usually a dust tight valve. It will be apparent that valves 100, 101 allow the section of pipe 44 between them to be isolated from both the exhauster fan and the combustion chamber when they are closed.

FIG. 1A is a schematic representation of exhauster fan 12 and the coal flow 14 leaving its outlet 16. While the present burner isolation valve invention will be illustrated in the context of an exhauster-supplied combustion chamber (sometimes known as a "suction" system), it will be apparent to those skilled in the art that the burner isolation valve invention described below can also be used with "pressurized" type systems in which the coal is moved by pressurized air whose source is upstream of the pulverizer.

Referring to FIG. 2, a manually operated isolation valve or gate according to the prior art is illustrated at 110, comprising a housing 112 welded or coupled in known fashion to delivery pipe 44 and having a normally-open circular passage 114 corresponding to the internal diameter of pipe 44 for unimpeded coal flow therethough. Passage 114 can be closed to isolate a portion of pipe 44 (solid lines) from another portion (broken lines) communicating with the combustion chamber or a pulverizer or exhauster. This is accomplished with a sliding valve plate 116 which can be manually activated at end 118 by a human operator to close pipe 44. In FIG. 2 the valve 110 is shown mostly open for purpose of illustration, with the forward or leading edge of valve plate 116 extending only partway into passage 114. FIG. 2 also illustrates a second "open" valve plate 116a that can be manually switched with solid plate 116 to place valve 110 in an open condition.

FIGS. 2A and 2B illustrate alternate versions of the prior art valve 110 in FIG. 2, the primary difference residing in their respective actuating mechanisms. Whereas the valve 110 in FIG. 2 is manually operated with a push-pull type valve plate, valve 110' is open and closed by rotating a control wheel 118' operating a threaded shaft and gearing mechanism to cause valve plate 116' to open and close passage 114'. FIG. 2B illustrates a second alternate prior art valve 110", with valve plate 16" activated by a hydraulic mechanism 18" in a manner known to those skilled in the art.

Figure 4:
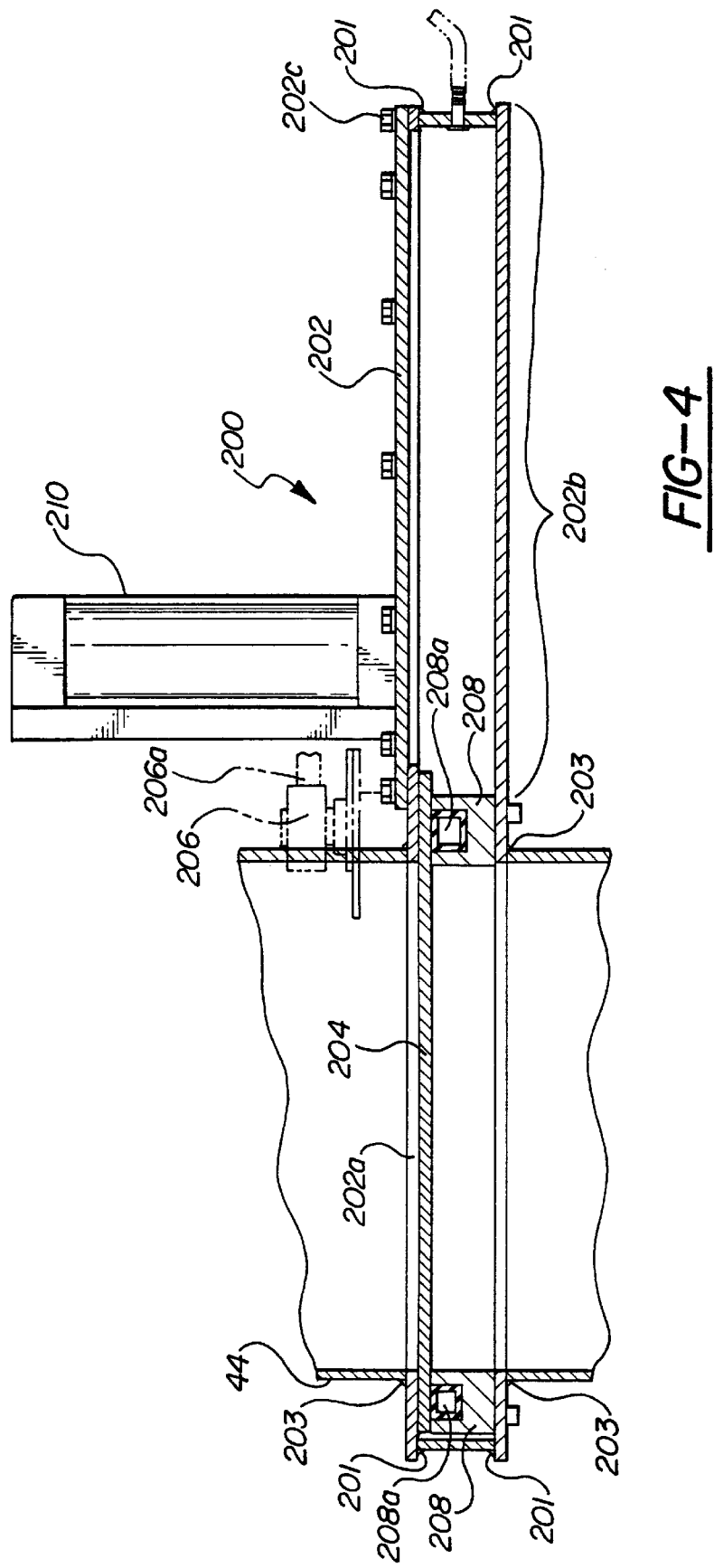
FIG. 4 is the same view of the invention shown in FIG. 3, but in the valve-closed position.
Figure 5:
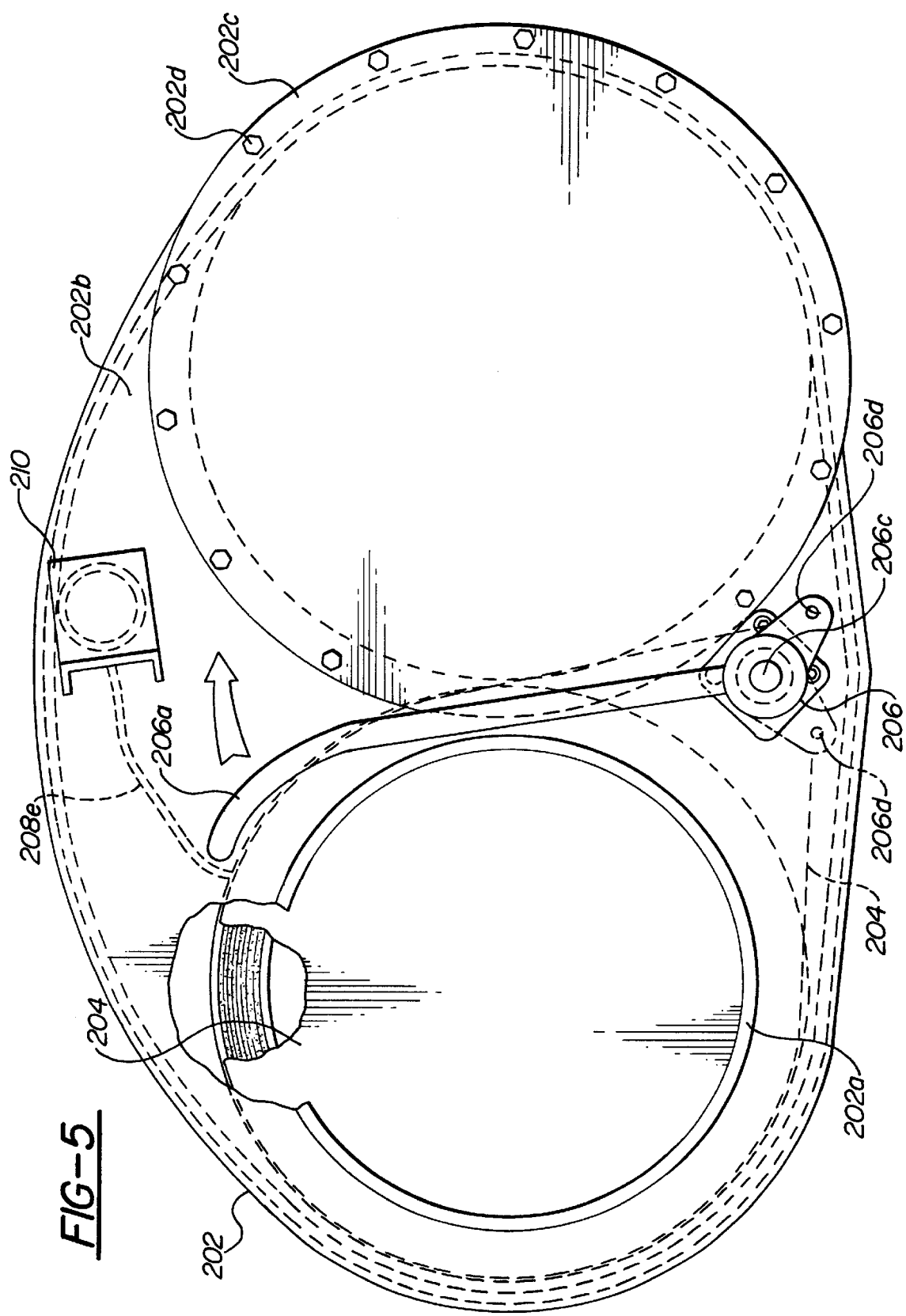
FIG. 5 is a plan view, partly in section, of the valve plate and housing of FIG. 3.

Referring next to FIGS. 3 through 5, a burner isolation valve 200 according to the present invention is illustrated as being welded to delivery pipe 44, which for purposes of perspective represents a twenty inch diameter pipe with ⅜ inch wall thickness. Valve 200 comprises a sealed housing 202 secured, for example, by welds 203 to pipe 44 with a circular passage 202a generally matching the internal diameter of pipe 44 for unimpeded coal flow when the valve is open.

Valve 200 is closed by an essentially circular valve plate 204 shown in the valve-open position in FIG. 3. Valve plate 204 is pivoted to a closed position blocking passage 202a by an actuator mechanism 206, in the illustrated embodiment an externally-operated lever actuator which rotates a pivot shaft secured to valve plate 204. The details of the lever-type actuator mechanism 206 are set forth below with reference to FIG. 5. It will be understood by those skilled in the art that lever-type actuator 206 and the rotating/pivoting operation of valve plate 204 are believed to be novel and inventive, but that other types of actuators could be purchased or fabricated by those skilled in the art to operate valve plate 204 now that the inventions have been disclosed.

Inventive valve 200 incorporates a novel seal mechanism 208 to seal passage 202a from the remainder of housing 202 in both the valve open and valve closed positions, in a manner described in further detail below. In the valve-open position of FIG. 3, seal mechanism 208 is shown sealing passage 202a from the remainder of housing 202 with a seal against an interior surface of housing 202. The seal is achieved with an annular, inflatable seal 208a coextensive with the circumference of pipe 44 and passage 202a.

In the preferred, illustrated form, housing 202 is formed from steel plating sufficiently strong to contain explosion forces from pipe 44 should an accident occur downstream from the isolation valve. Housing 202 includes an access hatch 202c removably secured by bolts 202d. It can be seen from FIG. 3 that the "outboard" portion 202b of housing 202 radially outside seal 208a is sealed from the environment, for example by welds 201 on the ends of the housing and with other measures such as sealed access hatch bolts 202d. The seal may be merely dust tight, or preferably can be air-tight for purposes described below.

Inflatable seal 208a is inflated and deflated by an air or air/fluid accumulator 210 of a commercially available type, preferably secured to housing 202 and connected in fluid communication with the interior of inflatable seal 208a by a hose or conduit 208e (best shown in FIGS. 5–7).

In a further preferred form of housing 202, the interior of the housing is pressurized around seal 208a to keep coal fines and dust out of the outboard portion 202b in which valve plate 204 rests in the valve-open position. Because inflatable seal 208a normally maintains a dust proof barrier around passage 202a when inflated, pressurizing the outboard portion 202b of housing 202 primarily serves to prevent the entry of coal fines in the event of a leak in the seal. A typical pressure sufficient to keep coal dust out of the outboard portion 202b of the housing is approximately 5–10 psi, although the actual value will depend on the pressure of coal flow in pipe 44. In the illustrated embodiment, pressurization may be achieved through a valve 202e supplied with pressurized air from a source (not shown) of a type known to those skilled in the art. Alternately, outboard portion 202b could be supplied with pressurized air from the accumulator 210, if air is used to inflate seal 208a.

Referring next to FIG. 4, valve plate 204 has been pivoted to the valve-closed position in which it fully closes passage 202a to isolate one side of pipe 44 from the other. Closing valve plate 204 first requires the deflation of seal 208a by accumulator 210. In the illustrated embodiment of FIG. 4, seal 208a is preferably re-inflated against the adjacent surface of valve plate 204 to further seal the seal-side section of pipe, particularly where valve plate 204 merely provides a "barrier" type closure in which the opposite side of the valve plate does not form a dust-tight seal against the housing around the pipe, but only an interference fit between the face of the valve plate and the housing. Even where the valve plate is made dust-tight with an additional seal or gasket for direct contact with the housing, re-inflation of seal 208a ensures that any coal fines or dust on the seal-side of the valve plate cannot reach outboard portion 202b of housing 202 or the upstream piping.

Figure 5A:
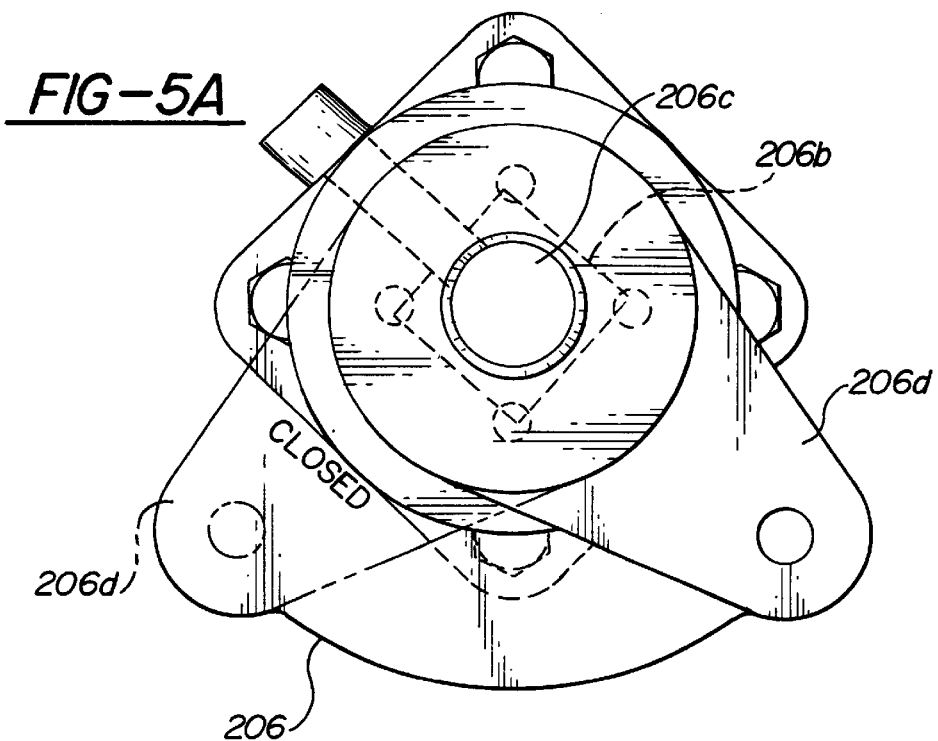
FIGS. 5A and 5B are close-up elevational and sectioned plan views, respectively, of the opening/closing mechanism illustrated in FIG. 5.
Figure 5B:
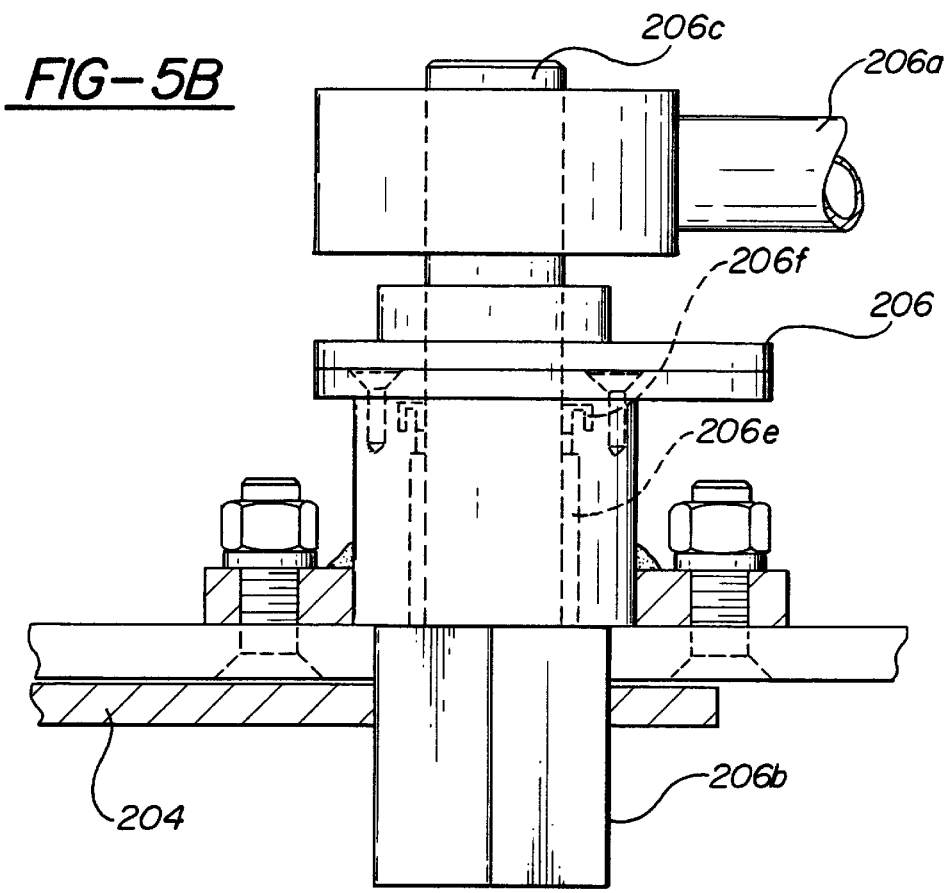

Referring to FIGS. 5 and 5A, 5B, the housing of the present invention is shown in plan view to better illustrate the opening/closing action of valve plate 204 via actuator 206, in the illustrated embodiment a manually-operated lever 206a.

Housing 202 is illustrated in a preferred oval or elliptical shape to accommodate the arcuate pivoting motion of valve plate 204.

Valve plate 204 is pivoted from its closed position (illustrated) covering passage 202a to its open position in the outboard end 202b of housing 202 simply by pushing or pulling lever 206a to rotate plate 204 on a pivot shaft 206c forming part of the actuating mechanism 206. In the illustrated embodiment, valve plate 204 is somewhat "teardrop" shaped, with its pointed end secured to a square-stemmed portion 206b of the pivot shaft by a suitable mating bore and set screw structure, for example. Illustrated actuator mechanism 206 is secured directly to housing 202 and includes a bushing 206e sealed as at 206f.

The interior of housing 202 is accessible by a maintenance cover 202c bolted with bolts 202d to the outboard end 202b of the housing. Maintenance cover 202c is slightly larger in diameter than valve plate 204, permitting removal of the valve plate when necessary.

While a manual actuating mechanism for valve plate 204 is illustrated in FIG. 5, it will be apparent to those skilled in the art that the manual lever arrangement may be replaced by other known pivot-enabling mechanisms, for example motors and the like.

In the illustrated embodiment of FIGS. 5 and 5A, 5B, actuating mechanism 206 includes open/closed indicating portion 206d which rotates with lever 206a to alternately cover and expose "open" and "closed" indicators on the baseplate underneath to indicate to an operator the condition of valve plate 204 without having to remove the maintenance cover.

Referring next to FIGS. 6 and 7, the seal mechanism 208 is illustrated in detail for the valve open and valve closed positions, respectively. In the valve-open position of FIG. 6, seal 208a is inflated directly against an interior wall of housing 202 to seal pipe 44 and passage 202a from the remainder of housing 202, in particular outboard portion 202b (best shown in FIGS. 3 and 4).

Inflatable seal 208a is preferably made from a heat and abrasion-resistant rubber type material. The seal is illustrated as rectangular in cross-section and is contained within a support bracket 208b which supports the side and bottom walls of the seal and further serves to guide it during inflation toward the sealing surface of housing 202. In the illustrated embodiment seal 208a preferably is formed with a series of step-like channels 208c for an improved seal with housing 202. Seal 208a is inflated through a valve 208d extending through the bottom or side of the seal and its support bracket and connected to a pressure supply hose 208e with a suitable coupling, for example the illustrated threaded pressure coupling. Seal 208a may be inflated with air or liquid, and in a preferred embodiment is inflated with a nonflammable liquid such as ethylene glycol which is leak-resistant.

It will be understood by those skilled in the art that although a rectangular cross-section seal is illustrated, other cross-sectional geometries can be used, as long as they provide an adequate seal with the valve plate.

In the illustrated embodiment, seal support bracket 208b is shown secured to the inside of the housing 202 by a cap screw 208f sealed with respect to the exterior of the housing.

As described above, fluid supply hose 208e can be coupled to the air/fluid accumulator 210 shown in FIGS. 3–5, although it will be understood that any known source of pressurized inflation fluid can be used.

Referring now to FIG. 7, seal 208a is shown deflated for the valve-closed position, in which valve plate 204 is pivoted across passage 202a. In FIG. 7, valve plate 204 is shown with an optional gasket 204a to make the valve a "dust tight" valve rather than merely a barrier type closure with respect to the passage in pipe 44. While in FIG. 7 seal 208a is shown deflated out of contact with the seal-side surface of valve plate 204, it will be understood that once the valve plate is in the valve-closed position as shown, seal 208a is typically re-inflated to engage the seal-side surface of the valve plate to further seal the interior of housing 202 from the pipe 44.

Figure 8:
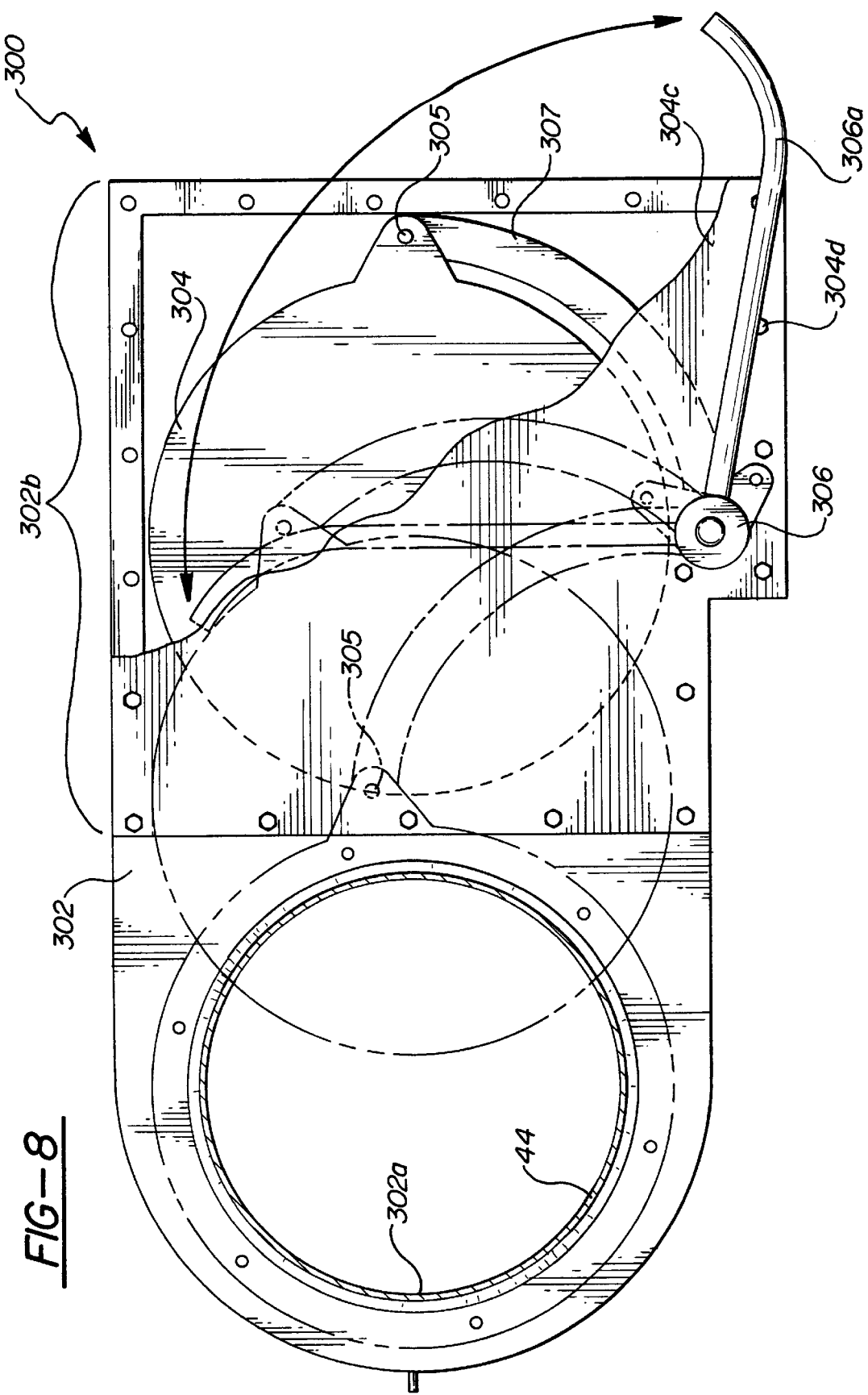
FIG. 8 is a plan view, partially sectioned, of an alternate pivoting valve plate mechanism.
Figure 8A:
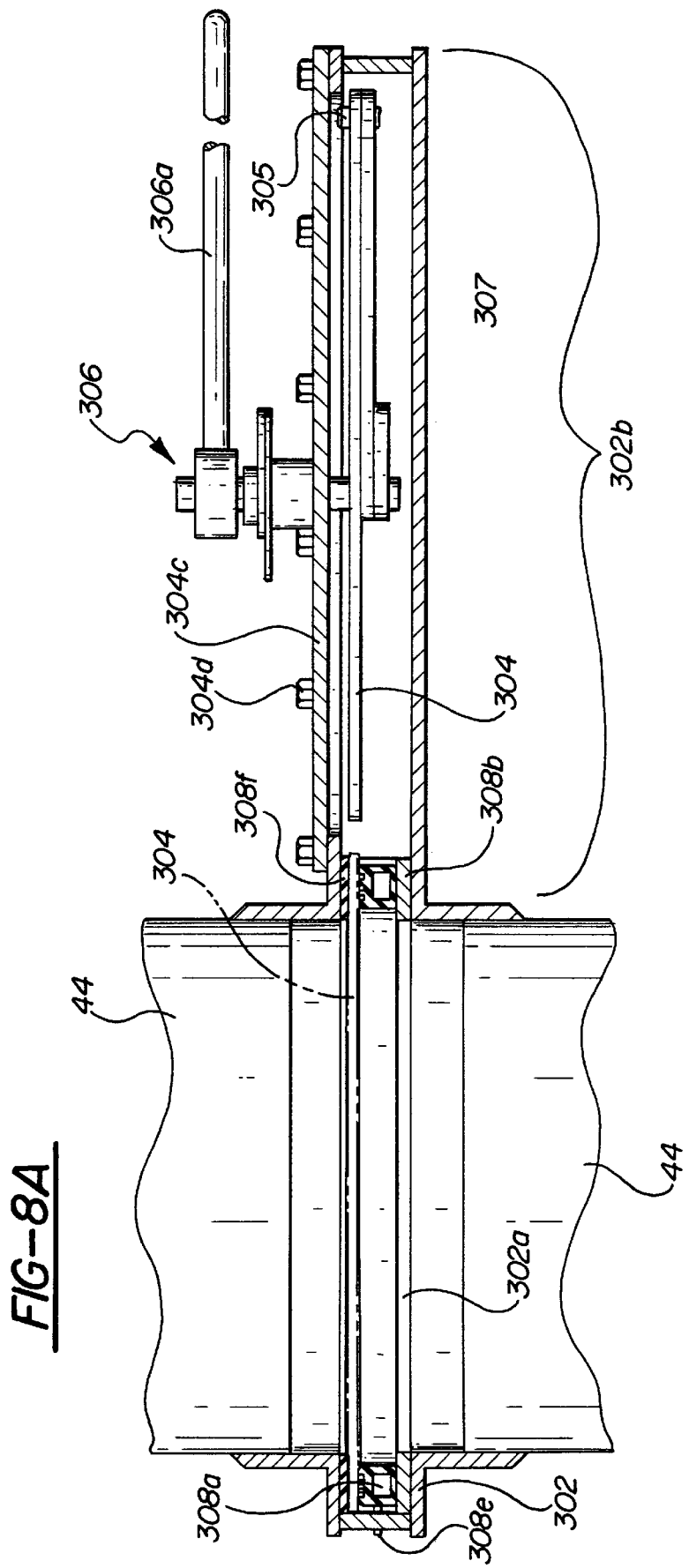
FIG. 8A is a side section view of the alternate pivoting valve plate mechanism of FIG. 8.

Referring next to FIGS. 8 and 8A, an alternate embodiment of the invention is generally illustrated at 300, comprising a housing 302 bisecting pipe 44 in a manner similar to that of housing 202 in FIG. 5. Housing 302 includes a passage 302a around pipe 44 for unimpeded flow of coal therethrough in the valve-open condition. The primary difference between the valve 300 of FIG. 8 and valve 200 of FIG. 5 resides in the opening and closing motion of valve plate 304.

Valve plate 304 is essentially circular, with a pivot connection to the end of an eccentric actuating arm 307 secured at its opposite end to a lever-type actuating mechanism 306 essentially identical to mechanism 206 in FIG. 5. Operation of lever arm 306a by an operator causes the translational movement of valve plate 304 shown in broken lines from the valve open position to the valve closed position and back again. Because the pivot connection with arm 307 turns the rotational movement of lever arm 306a into a straight translational movement of valve plate 304, housing 302, and in particular its outboard portion 302b, is relatively straight (in the illustrated embodiment, rectangular).

Access to outboard portion 302b of the housing, and to valve plate 304 contained therein, is through an access hatch 304c secured by bolts 304d.

FIG. 8A illustrates an advantage of the valve-operating mechanism 306, namely that it can be mounted entirely in the outboard portion 302b of the housing.

It will be apparent from FIG. 8A that the novel seal mechanism 208 remains essentially unchanged, except that it is illustrated as being supported in an annular housing 308b provided as an endwise insert in housing 302 with a side-mounted inflation valve 308e, cooperating with a dust-proof seal 308f that engages the upper face of valve plate 304 in the valve closed position.

Referring next to FIGS. 9 and 9A, a further embodiment of the invention is generally illustrated at 400, comprising a shortened housing 402 having a circular passage 402a extending through the housing and matching the flow area of pipe 44. Upper and lower collars 402b border passage 402 on the outside of the housing to mount the housing to the pipe. A valve plate 404 (broken lines in FIG. 9) is capable of being removably mounted in housing 402, sliding in and out of the open end 402c of the housing as needed. Valve plate 404 preferably has a geometry similar to the interior of housing 402, and will generally be made from steel.

Open end 402c of the housing is closed by a hinged cover plate 403 rotating on hinges 403a. Cover plate 403 has a peripheral sealing surface 403b, such as a smooth metal portion of the plate or a sealing gasket, adapted to seat closely against and seal flange 402d surrounding open end 402c.

Housing 402 includes an inflatable seal assembly 408 similar to seal assembly 208 illustrated in FIGS. 3–7. Seal assembly 408 includes an annular support bracket 408b having a generally U-shaped cross section containing an inflatable seal 408a. Seal 408a is inflated with a pressurized fluid such as air through a valve assembly 408c which can project through a small opening 408d when the seal assembly is fully inserted in the housing. In FIG. 9 the seal assembly 408 is shown pulled partway from the interior of the housing for purposes of illustration; normally, the seal assembly will be inserted fully in the housing and mounted to coaxially surround opening 402a.

When valve 400 is "open", i.e. when opening 402a is unobstructed for normal pipe flow through the valve, the interior of housing 402 can be sealed relative to flow through the pipe by inflating seal 408a against the upper interior surface or "ceiling" of housing 402. The distance between the deflated seal and the ceiling of housing 402 will typically be on the order of an inch or less, the distance being predetermined to accommodate the thickness of valve plate 404.

To close valve 400, thereby isolating the sections of pipe on either side of the valve, valve plate 404 is simply inserted into the open end of the housing above seal 408a after the seal has been deflated. The seal is then re-inflated against the bottom surface of the valve plate (FIG. 9A) to maintain a dust tight seal relative to the interior of housing 402.

In some circumstances it might be desirable to customize the fit of a slightly over-diameter seal assembly 408 to passage 402a by means of a gap-closing plate similar to plate 404, but including a circular cutout more closely matching the diameter of passage 402a. By matching such a circular opening in the plate with the passage 402a through the housing, any gap that might exist due to the difference in diameter between seal assembly 408 and opening 402a can be eliminated by inserting the one or more gap-closing plates above the seal and inflating the seal thereagainst.

Once closed, cover plate 403 is securely locked to flange 402d by a plurality of hand-operated nut mechanisms 406 rotatably mounted on pivoting bolt members 406b at various locations around the open end of the housing. When cover plate 403c is closed, bolt members 406b can be rotated about their pivot points 406c to engage slots 403c on the cover plate, and the hand-operated nut portion 406a wound down to clamp against the outer face of cover plate 403. This provides a multi-point lockdown of the housing, which can be useful for long-term shutoff of a particular delivery pipe, or where an extremely explosion-resistant housing is desired.

Opening and closing the hinged cover plate 403 can be assisted with an optional handle 403d on the outer face of the cover plate.

The foregoing are preferred embodiments of the invention, and it will be understood by those skilled in the art that these particular examples are not intended to limit the invention beyond the scope of the following claims. Various dimensions and shapes of the illustrated embodiments can be changed without departing from the scope of the invention. Likewise, substitutions of known and equivalent materials, fastening techniques and apparatus, and other matters of ordinary skill may be applied to the invention to fit it to particular applications. Accordingly, we claim:

What is claimed is:

1. In combination with a coal delivery pipe between a delivery source and a burner in a combustion chamber, a burner isolation valve comprising:

a valve housing intersecting the pipe and having a passage corresponding substantially to the flow area of the pipe;

a valve plate movable between a closed position in the housing covering the passage, and an open position removed from the passage, the improvement comprising a seal mechanism mounted on an interior surface of the housing in surrounding coextensive relationship to the passage and spaced from the valve plate, the seal mechanism including an inflatable seal inflated against an opposing interior surface of the housing around the passage to seal the passage from a remainder of the housing when the valve plate is in the open position.

2. The apparatus of claim 1, wherein the housing encloses the valve plate in both the valve closed and valve open positions, the housing having an outboard portion radially exterior of the passage and seal, and the valve plate being movable within the housing between the valve closed position covering the passage and the valve open position in which the valve plate is removed from the passage and is in the outboard portion of the housing.

3. The apparatus of claim 2, further including a valve plate actuating mechanism operable from outside the housing.

4. The apparatus of claim 3, wherein the valve plate actuating mechanism is sealed with respect to the housing.

5. The apparatus of claim 3, wherein the valve plate actuating mechanism is a pivot mechanism attached to the valve plate to pivot the valve plate from the valve open position in the outboard portion of the housing to the valve closed position covering the passage.

6. The apparatus of claim 5, wherein the valve plate is connected directly to the pivot mechanism and rotates through an arc from the valve open position to the valve closed position, the valve housing including an arcuate portion accommodating the arcuate motion of the valve plate.

7. The apparatus of claim 5, wherein the housing defines a linear path for the valve plate between the valve open and valve closed positions, the valve plate being connected to the pivot mechanism by an eccentric arm which translates the pivot motion of the pivot mechanism to a linear opening and closing motion of the valve plate.

8. The apparatus of claim 1, wherein the seal is partially constrained in a support bracket, such that only an unconstrained portion of the seal is inflated against the valve housing in the valve closed position.

9. The apparatus of claim 1, wherein a sealable portion of the valve plate in the valve closed position occupies a space normally occupied by the inflated seal in the valve open position.

10. The apparatus of claim 9, wherein the inflatable seal is inflated against the sealable portion of the valve plate in the valve closed position.

11. The apparatus of claim 1, wherein the valve plate includes a dust tight seal positioned to engage the housing in the valve closed position.

12. The apparatus of claim 1, wherein the housing is sealed relative to the environment.

13. The apparatus of claim 12, wherein the housing is pressurized to a pressure greater than pressure in the delivery pipe, such that coal fines in the delivery pipe are constrained from entering the housing exteriorly of the passage and seal.

14. The apparatus of claim 1, wherein the seal is inflated by a source of pressurized fluid located on the housing.

15. The apparatus of claim 13, wherein the housing is pressurized by a mechanism which is also used to inflate the seal.

16. The apparatus of claim 1, wherein the housing encloses the valve plate in the valve closed position, the housing having an opening through which the valve plate can be removed to define the valve open position, the opening having a closure.

17. The apparatus of claim 16, wherein a sealable portion of the valve plate in the valve closed position occupies the space normally occupied by the inflated seal in the valve open position, and further wherein the inflatable seal is adapted to be inflated against the sealable portion of the valve plate in the valve closed position.

18. In combination with a delivery pipe passing a mixed flow of air and particulate matter such as ground coal fines between a delivery source and a receiving source, an isolation valve comprising:

a valve housing intersecting the pipe and having a passage corresponding substantially to the flow area of the pipe;

a valve plate movable between a closed position in the housing covering the passage, and an open position removed from the passage, the improvement comprising a seal mechanism mounted on an interior surface of the housing in surrounding coextensive relationship to the passage, the seal mechanism including an inflatable seal inflated against an opposing interior surface of the housing around the passage to seal the passage from a remainder of the housing when the valve plate is in the open position.

19. The apparatus of claim 18, wherein the housing encloses the valve plate in both the valve closed and valve open position, the housing having an outboard portion radially exterior of the passage and seal, and the valve plate being movable within the housing between the valve closed position covering the passage and the valve open position in which the valve plate is removed from the passage and is in the outboard portion of the housing.

20. The apparatus of claim 18, wherein a sealable portion of the valve plate in the valve closed position occupies a space normally occupied by the inflated seal in the valve open position, and the inflatable seal is inflated against the sealable portion of the valve plate in the valve closed position.

21. In combination with a coal delivery pipe between a delivery source and a burner in a combustion chamber, a burner isolation valve comprising:

a valve housing intersecting the pipe and having a passage corresponding substantially to the flow area of the pipe;

a valve plate movable between a closed position in the housing covering the passage, and an open position removed from the passage, the improvement comprising an annular seal mechanism on the housing in annular surrounding relationship to the passage, the annular seal mechanism including an annular, inflatable seal adapted to be inflated against an interior surface of the housing around the passage to seal the passage from a remainder of the housing when the valve plate is in the open position, an annular portion of the valve plate in the valve closed position occupying a space normally occupied by the inflated seal in the valve open position, the annular portion of the valve plate being adapted to be sealed by the inflatable seal in the valve closed position.

* * * * *

UNITED STATES PATENT AND TRADEMARK OFFICE
CERTIFICATE OF CORRECTION

PATENT NO. : 6,260,490 B1
DATED : July 17, 2001
INVENTOR(S) : Wark

Page 1 of 1

It is certified that error appears in the above-identified patent and that said Letters Patent is hereby corrected as shown below:

<u>Title page,</u>
In the title, delete the word "BURNER".

<u>Column 1,</u>
In the heading, delete the word "BURNER".

<u>Column 4,</u>
Line 16, delete "16"" and insert -- 116" --.
Line 17, delete "18"" and insert -- 118" --.

Signed and Sealed this

Second Day of April, 2002

Attest:

*Attesting Officer*

JAMES E. ROGAN
*Director of the United States Patent and Trademark Office*